United States Patent [19]

Lee

[11] Patent Number: 5,729,667

[45] Date of Patent: Mar. 17, 1998

[54] POWER SAVING FACSIMILE DEVICE

[75] Inventor: Gang-Bock Lee, Goomi, Rep. of Korea

[73] Assignee: SamSung Electronics Co., Ltd., Kyungki-do, Rep. of Korea

[21] Appl. No.: 593,403

[22] Filed: Jan. 29, 1996

[30] Foreign Application Priority Data

Jan. 27, 1995 [KR] Rep. of Korea ............... 1626/1995

[51] Int. Cl.$^6$ ............................................. H04N 1/02
[52] U.S. Cl. .......................... 395/113; 358/437; 358/442
[58] Field of Search ........................... 358/400, 442, 358/468, 437; 395/113, 114, 115, 758; 348/730; 399/88–90; 379/100, 372, 373, 375, 413; H04N 1/00, 1/02

[56] References Cited

U.S. PATENT DOCUMENTS

| | | |
|---|---|---|
| 4,747,041 | 5/1988 | Engel et al. . |
| 5,003,578 | 3/1991 | Lin . |
| 5,163,124 | 11/1992 | Yabe et al. . |
| 5,282,054 | 1/1994 | Oana et al. . |
| 5,325,209 | 6/1994 | Manabe ............ 358/437 |
| 5,347,167 | 9/1994 | Singh . |
| 5,392,023 | 2/1995 | D'Avello et al. . |
| 5,475,500 | 12/1995 | Takeda ............ 358/442 |
| 5,483,464 | 1/1996 | Song . |
| 5,528,385 | 6/1996 | Manning ............ 358/442 |

FOREIGN PATENT DOCUMENTS

| | | |
|---|---|---|
| 0 701 361 A2 | 3/1996 | European Pat. Off. . |
| 03-108941 | 5/1991 | Japan . |

*Primary Examiner*—Kim Vu
*Attorney, Agent, or Firm*—Robert E. Bushnell, Esq.

[57] ABSTRACT

A power saving facsimile includes a power supply circuit for supplying a plurality of voltage levels. A switch disconnects and connects the plurality of voltage levels from and to corresponding circuits in response to first and second states of a switching control signal, respectively. A driving signal output circuit outputs a driving signal in response to sensing a speech forming signal applied from a central office line. A power controller generates the switching control signal in the first state to interrupt the voltages when the facsimile device has not been used for a predetermined time period, and generates the switching control signal in the second state to provide the voltages in response to the driving signal.

16 Claims, 2 Drawing Sheets

POWER SAVING FACSIMILE DEVICE

CROSS-REFERENCE TO RELATED APPLICATIONS

This application makes reference to, incorporates the same herein, and claims all benefits accruing under 35 U.S.C. §119 from an application for Power Saving Facsimile Device earlier filed in the Korean Industrial Property Office on 27 Jan. 1995 and there assigned Ser. No. 1626/1995.

BACKGROUND OF THE INVENTION

The present invention relates to a facsimile device, and more particularly, to a power saving facsimile device capable of reducing power consumption by being provided with only a minimum level of power when not used for a given time period.

Recently, an energy star computer program sponsored by the U.S. Environmental Protection Agency (EPA) allows manufacturers of energy efficient office equipment complying with specified contractual terms and conditions to use a designated energy star logo indicating the energy efficiency of their product. The energy star computer program is a cooperative effort between the U.S. Environmental Protection Agency and computer device manufacturers to promote the production and sale of energy efficient office equipment. The program is particularly aimed at reducing air pollution resulting from the generation of power necessary to operate currently available office equipment. Accordingly, the program encourages the production of office equipment having power saving features. Such equipment consumes less power, and thus helps reduce the production of air pollution.

An early prior art reference directed towards the conservation of electrical energy is disclosed in U.S. Pat. No. 4,747,041 entitled Automatic Power Control System Which Automatically Activates And Deactivates Power To Selected Peripheral Devices Based Upon System Requirement issued to Engel et al. In Engel et al. '041, a controller provides selective, non-manual power control of various components of data processing equipment, and reports the power status of such components to a central location. While this early effort to conserve electrical energy is certainly useful in its own right, I note that there is a need in the realm of office equipment for a power saving facsimile device. Accordingly, the present invention recognizes and addresses this need.

SUMMARY OF THE INVENTION

It is therefore an object of the present invention to provide a power saving facsimile device capable of reducing power consumption.

It is another object to provide a power saving facsimile device capable of reducing power consumption by providing the facsimile device with only a minimum level of power when not used for a predetermined time period.

It is still another object to provide a power saving facsimile device capable of achieving a degree of power consumption while the facsimile device is in a stand-by state.

To achieve these and other objects, the present invention provides a facsimile device including a power supply circuit for supplying a plurality of voltage levels. A switch disconnects and connects the plurality of voltage levels from and to corresponding circuits in response to first and second states of a switching control signal, respectively. A driving signal output circuit outputs a driving signal in response to sensing a speech forming signal applied from a central office line. A power controller generates the switching control signal in the first state to interrupt the voltages when the facsimile device has not been used for a predetermined time period, and generates the switching control signal in the second state to provide the voltages in response to the driving signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT

Figure 1:
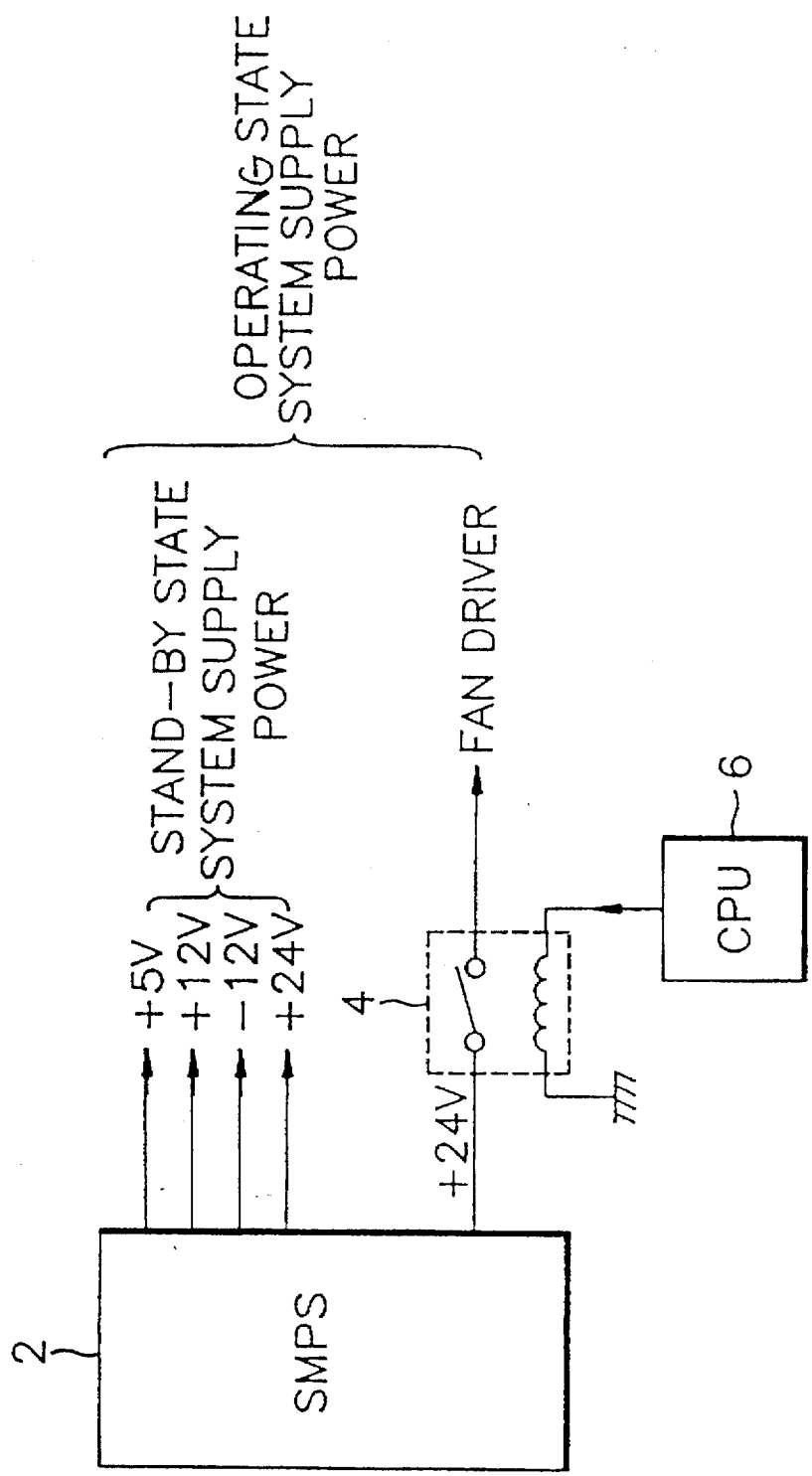
FIG. 1 shows an abstract representation of a circuit for supplying various voltage levels to a facsimile device.

Turn now to the drawings and referring to FIG. 1, an abstract representation of a circuit for supplying various voltage levels to a facsimile device is shown. In FIG. 1, a switching mode power supply (SMPS) 2 provides voltages having various magnitudes (e.g., +5V, +12V, −12V, +24V, etc.) to respective circuits in a facsimile device. While the facsimile device performs its general functions, a switch 4 remains in an on (i.e., closed) state under the control of a central processing unit (CPU) 6. The voltage supplied through switch 4 (i.e., +24V) is used for the components and circuitry of the facsimile device that consume a lot of operating power, such as a fan driver and a heater, etc. As indicated in FIG. 1, the various voltages are used to provide the operating state system supply power.

In FIG. 1, if the user does not use the facsimile device for a predetermined time period, central processing unit (CPU) 6 switches switch 4 to an off (i.e., open) state in order to reduce unnecessary power consumption. Therefore, in these situations, the voltage supplied through switch 4 (e.g., +24V) is not provided to the fan driver and heater. These situations, when the facsimile device has not been used for a predetermined time period, represent the stand-by state of the facsimile device. In the stand-by state, however, the voltages supplied from switching mode power supply (SMPS) 2, (i.e., +5V, +12V, −12V, +24V, which are used to provide the stand-by state system supply power, are still provided to predetermined circuits of the facsimile device.

Accordingly, in the stand-by state, the circuit of FIG. 1 interrupts the supply of power to components and circuitry that consume a large amount of power, but still provides operating power for the remaining circuits. Thus, optimal power savings are not achieved with the circuit shown in FIG. 1.

Figure 2:
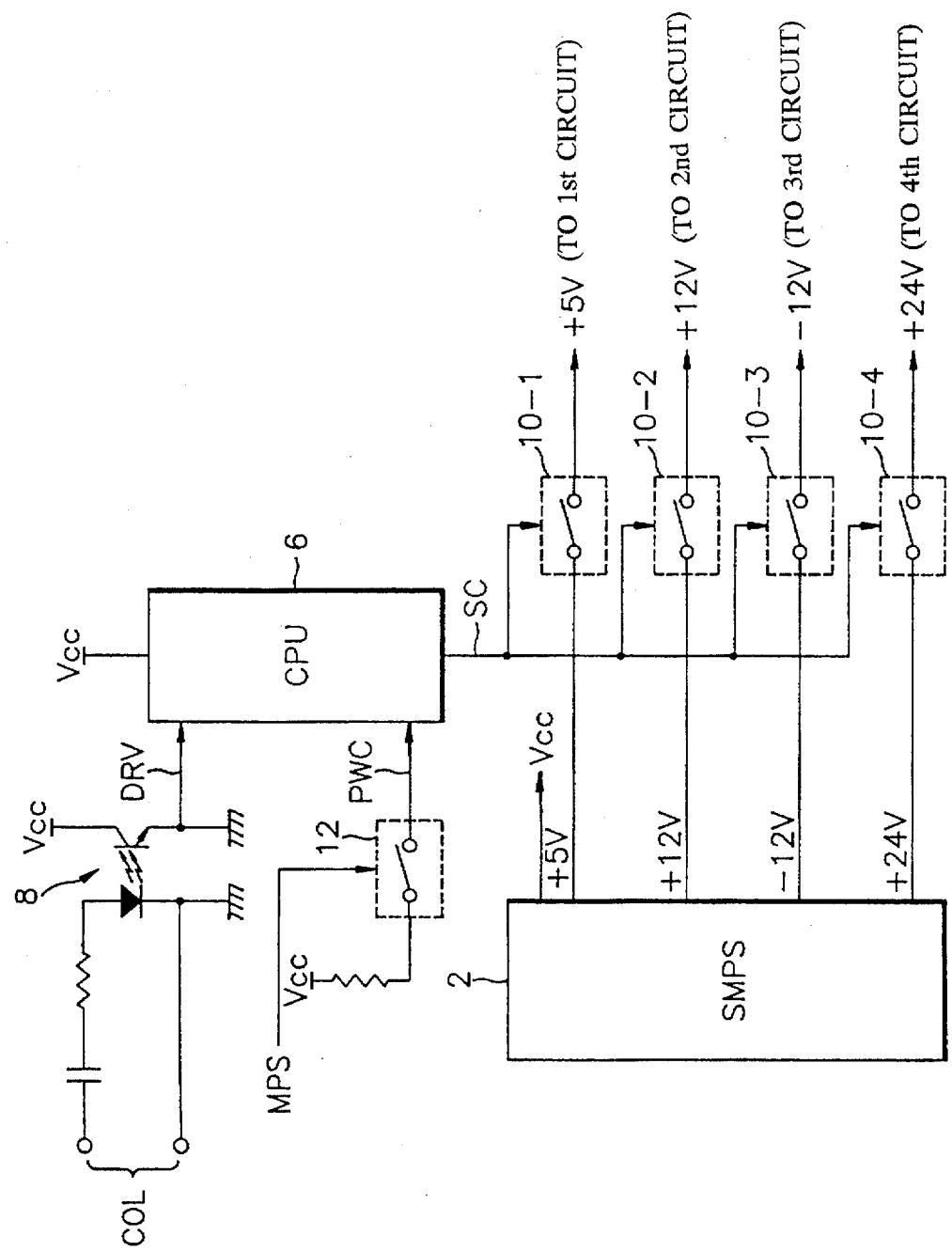
FIG. 2 shows a power saving circuit for a facsimile device constructed according to the principles of the present invention.

Referring now to FIG. 2, a power saving circuit for a facsimile device constructed according to the principles of the present invention is shown. The circuit of FIG. 2 includes a switching mode power supply (SMPS) 2 for supplying first, second, third and fourth voltages to first, second, third and fourth switches 10-1, 10-2, 10-3 and 10-4, respectively. First, second, third and fourth switches 10-1, 10-2, 10-3 and 10-4 are switched off in response to a first state of a switching control signal (SC), and thereby interrupt the supply of first, second, third and fourth voltages to first, second, third and fourth corresponding circuits. Similarly, first, second, third and fourth switches 10-1, 10-2, 10-3 and 10-4 are switched on in response to a second state of switching control signal (SC), and thereby provide first, second, third and fourth voltages to first, second, third and fourth corresponding circuits. The first, second, third and fourth circuits each represent one or more components of the facsimile device that utilize a corresponding voltage level. A photo coupler 8 detects a speech forming signal applied from a central office line (COL) and outputs a driving signal (DRV) to a central processing unit (CPU) 6. A fifth switch 12 receives a manual power supply signal (MPS) corresponding to a user input selection, and also provides output of a power control signal (PWC) to central processing unit (CPU) 6. Central processing unit (CPU) 6 generates switching control signal (SC) in a first state (i.e., the first switching control signal) to switch first, second, third and fourth switches 10-1, 10-2, 10-3 and 10-4 off when the user does not use the facsimile device for a predetermined time period, and generates switching control signal (SC) in a second state (i.e., the second switching control signal) to switch first, second, third and fourth switches 10-1, 10-2, 10-3 and 10-4 on in response to driving signal (DRV) output from photo coupler 8.

The operation of the present invention will now be described in detail with reference to FIG. 2.

In FIG. 2, when the facsimile device performs its normal functions, switching mode power supply (SMPS) 2 provides the various voltages (i.e., +5V, +12 V, -12V, +24V) to respective circuits through first, second, third and fourth switches 10-1, 10-2, 10-3 and 10-4, respectively. During this time, the first to fourth switches 10-1 to 10-4 remain in the on state under the control of central processing unit (CPU) 6. As the respective circuits in the facsimile device receive requisite operating power, the facsimile device can perform its normal functions. Switching mode power supply (SMPS) 2 also provides a power supply voltage Vcc to specific circuit components, namely central processing unit (CPU) 6, a transistor of photo coupler 8 and one end of fifth switch 12.

In the stand-by state that occurs when the user does not use the facsimile device for a predetermined time period, central processing unit (CPU) 6 applies switching control signal (SC) in a first state to first, second, third and fourth switches 10-1, 10-2, 10-3 and 10-4 to thereby switch them to the off state. Accordingly, all operating power that is provided to predetermined circuits through switches 10-1, 10-2, 10-3 and 10-4 is interrupted. In the stand-by state, switching mode power supply (SMPS) 2 continues to provide power supply voltage Vcc to central processing unit (CPU) 6, the transistor of photo coupler 8 and the one end of fifth switch 12 to enable their respective operations. When a signal related to a driving operation of the facsimile device (e.g., a ring signal or manual power supply signal (MPS)) is generated during the stand-by state, the circuits in the facsimile device are provided with corresponding levels of operating power.

If the ring signal is applied to photo coupler 8 through the central office line (COL) while the facsimile device is in the stand-by state, photo coupler 8 outputs driving signal (DRV) to central processing unit (CPU) 6. In response to receipt of driving signal (DRV), central processing unit (CPU) 6 applies switching control signal (SC) in a second state to the first to fourth switches 10-1 to 10-4, thus controlling these four switches to be in the on state. Accordingly, the voltages +5V, +12V, -12V, +24V are provided from switching mode power supply (SMPS) 2 to respective circuits through the first to fourth switches 10-1 to 10-4, so that the facsimile device can perform its normal functions.

If a user wants to perform an operation with the facsimile device, such as calling or printing, during the stand-by state, the user presses fifth switch 12 for controlling the manual power supply. In response to depression of fifth switch 12, manual power supply signal (MPS) is applied to fifth switch 12, and fifth switch 12 switches to the on state. Fifth switch 12 is preferably constructed as a switch that operates in response to depression of a given key on a keypad of the facsimile device.

When fifth switch 12 shifts to the on state in response to manual power supply signal (MPS), power control signal (PWC) corresponding to power supply voltage Vcc is applied to central processing unit (CPU) 6. In response to power control signal (PWC), central processing unit (CPU) 6 provides switching control signal (SC) in a second state to the first to fourth switches 10-1 to 10-4 so that these switches shift to the on state. Accordingly, respective circuits in the facsimile device are provided with corresponding voltages applied from switching mode power supply (SMPS) 2, and the facsimile device can perform its normal functions.

As described above, the present invention selectively provides operating voltages to circuit components of a facsimile device to thereby conserve operating power. When an external driving signal or speech forming signal are applied, all of the circuits are provided with voltage. Accordingly, the present invention provides an advantage of reducing power consumption when a user does not use the facsimile device for a predetermined time period.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A power saving facsimile device, comprising:
   power supply means for supplying a plurality of voltages having various magnitudes;
   switching means for disconnecting said power supply means from corresponding circuits in response to a first switching control signal, and for connecting said power supply means to said corresponding circuits in response to a second switching control signal;
   driving signal output means for outputting a driving signal in response to a ring signal provided via an office line; and
   power control means for detecting when said facsimile device has not been used for a predetermined time period and for generating said first switching control signal in response thereto, and for generating said second switching control signal in response to said driving signal.

2. The power saving facsimile device as claimed in claim 1, further comprising manual power supply means for outputting a power control signal in response to a user input for enabling said power control means to generate said second switching control signal.

3. The power saving facsimile device as claimed in claim 2, wherein said manual power supply means comprises a switching device that is switched on in response to said user input.

4. The power saving facsimile device as claimed in claim 1, wherein said driving signal output means comprises a photo coupler for outputting said driving signal in response to said ring signal provided via said office line.

5. The power saving facsimile device as claimed in claim 3, wherein said driving signal output means comprises a photo coupler for outputting said driving signal in response to said ring signal provided via said office line.

6. A power saving facsimile device, comprising:

power supply means for supplying first, second, third and fourth voltages;

first, second, third and fourth switching means for disconnecting said power supply means from first, second, third and fourth circuits in response to a first switching control signal, and for respectively connecting said power supply means to said first, second, third and fourth circuits in response to a second switching control signal;

driving signal output means for outputting a driving signal in response to a ring signal provided via an office line;

manual power supply means for outputting a power control signal in response to a user input; and power control means for detecting when said facsimile device has not been used for a predetermined time period and for generating said first switching control signal in response thereto, and for generating said second switching control signal in response to one of said driving signal and said power control signal.

7. The power saving facsimile device as claimed in claim 6, wherein said manual power supply means comprises a switching device that is switched on in response to said user input.

8. The power saving facsimile device as claimed in claim 6, wherein said driving signal output means comprises a photo coupler for outputting said driving signal in response to said ring signal provided via said office line.

9. The power saving facsimile device as claimed in claim 7, wherein said driving signal output means comprises a photo coupler for outputting said driving signal in response to said ring signal provided via said office line.

10. The power saving facsimile device as claimed in claim 6, further comprised of said power supply means for supplying a predetermined voltage to said driving signal output means, said manual power supply means and said power control means.

11. A facsimile device, comprising:

power supply means for supplying first, second, third and fourth voltages;

switching means for disconnecting said power supply means from corresponding circuits in response to a first switching control signal, and for connecting said power supply means to said corresponding circuits in response to a second switching control signal;

driving signal output means for outputting a driving signal in response to a ring signal provided via an office line; and power control means for detecting a stand-by state when said facsimile device has not been used for a predetermined time period and for generating said first switching control signal in response thereto, and for generating said second switching control signal in response to said driving signal.

12. The facsimile device as claimed in claim 11, further comprising manual power supply means for outputting a power control signal in response to a user input for enabling said power control means to generate said second switching control signal.

13. The power saving facsimile device as claimed in claim 12, wherein said manual power supply means comprises a switching device that is switched on in response to said user input.

14. The power saving facsimile device as claimed in claim 11, wherein said driving signal output means comprises a photo coupler for outputting said driving signal in response to said ring signal provided via said office line.

15. The power saving facsimile device as claimed in claim 12, further comprised of said power supply means for supplying a predetermined voltage to said driving signal output means, said manual power supply means and said power control means.

16. A method for saving power in a facsimile device, comprising the steps of:

disconnecting a power supply means which supplies a plurality of voltages from corresponding circuits within said facsimile device in response to detection of activation of a stand-by state wherein said facsimile device has not been used for a predetermined time period; and connecting said power supply means which supplies said plurality of voltages to said corresponding circuits in response to said facsimile device receiving one of a ring signal via a communication line and a manual key input from a user.

* * * * *